Feb. 28, 1967    T. E. TUCCINARDI    3,306,113
TRANSDUCER PROVIDING ALTERNATING-CURRENT OUTPUT IN RESPONSE
TO ROTATION OF TRANSDUCER BODY RELATIVE TO INERTIAL
CONDUCTIVE FLUID CONTAINED THEREIN
Filed Oct. 3, 1963

INVENTOR
THOMAS E. TUCCINARDI

BY Harry M. Saragovitz,
Edward J. Kelly,
Herbert Berl &
J. D. Edgerton

ATTORNEYS

United States Patent Office 3,306,113
Patented Feb. 28, 1967

3,306,113
TRANSDUCER PROVIDING ALTERNATING-CURRENT OUTPUT IN RESPONSE TO ROTATION OF TRANSDUCER BODY RELATIVE TO INERTIAL CONDUCTIVE FLUID CONTAINED THEREIN
Thomas E. Tuccinardi, Silver Spring, Md., assignor to the United States of America as represented by the Secretary of the Army
Filed Oct. 3, 1963, Ser. No. 313,713
6 Claims. (Cl. 73—505)

The invention described herein may be manufactured and used by or for the Government of the United States of America for governmental purposes without the payment to me of any royalty thereon.

This invention relates to devices for sensing and measuring rotation and more particularly to an improved and highly sensitive rotation sensing device, or transducer, that produces an electrical output signal indicative of the direction and magnitude of rotation.

My rotational sensing devices are particularly well suited to use in missiles and space vehicles. The problem of sensing and measuring rotation in such vehicles is difficult and important. Numerous approaches have been suggested and tried with varying degrees of success. My invention provides a practical, economical, rugged, and highly sensitive rotational transducer. I consider my transducer to be an important advance in the rotational transducer art.

The principal object of my invention is to provide a rotational transducer that is economical, rugged, and practical, and that has substantially higher sensitivity than known rotational transducers of comparable simplicity.

A preferred embodiment of my invention comprises of comparable simplicity.

A preferred embodiment of my invention comprises an annular channel filled with mercury. The channel is of rectangular cross section. The radially inner and outer walls of the channel are of conductive metal. The axial extremities of the channel are sealed with an electrically non-conductive material. Means are provided for applying an axial alternating magnetic field to the annular channel containing mercury. An annular iron core of approximately the same diameter as the mercury-containing annular channel is positioned coaxially with and in close proximity to the annular channel. A plurality of U-shaped straps electrically connect the inner and the outer metallic walls of the annular channel and encircle the annular core. If the foregoing transducer structure is rotated about its axis, an alternating radial potential gradient is developed in the mercury and causes current to flow through the copper straps, generating an alternating magnetic field in the annular core. A secondary winding consisting of a large number of turns of fine wire is wound around the annular core. The output of this secondary winding, together with a portion of the alternating current voltage employed to generate the alternating magnetic field applied to the annular channel, is applied to a synchronous detector. The output of the synchronous detector is a rectified voltage the polarity of which shows the direction of rotation and the amplitude of which shows the rate of rotation of the rigid transducer with respect to the mercury in the annular channel.

The specific nature of the invention, as well as other objects, uses and advantages thereof, will clearly appear from the following description and from the accompanying drawing, in which.

Figure 1:
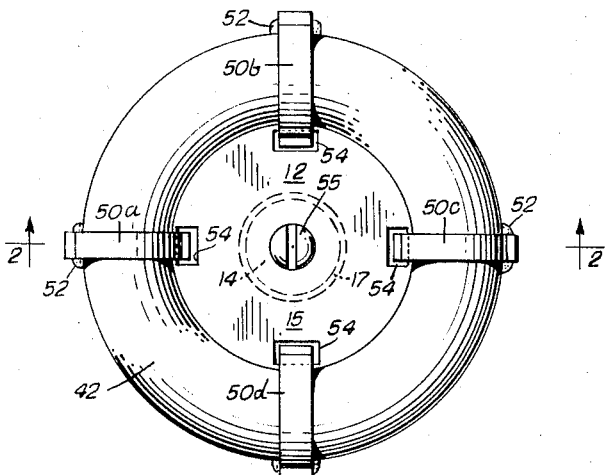
FIG. 1 is a plan view of the main transducer structure of a preferred embodiment of my invention.
Figure 2:
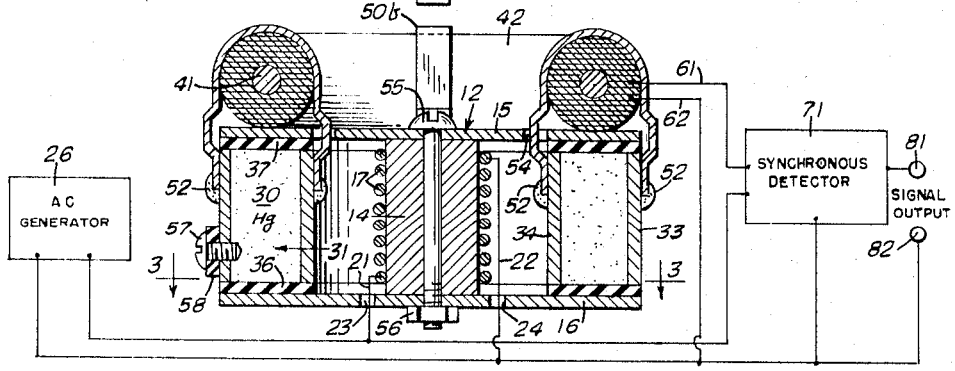
FIG. 2 is a representation of a preferred embodiment of my invention. The representation is in part schematic and in part an axial section of the device of FIG. 1 in the plane 2—2.
Figure 3:
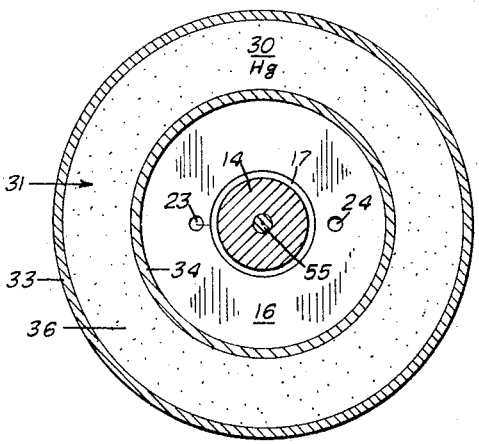
FIG. 3 is a cross section of the device of FIG. 1 taken in the plane 3—3 of FIG. 2.

In the figures, the main transducer structure 12 comprises an electromagnet including a cylindrical core 14 of soft iron and metal end plates 15 and 16 also of soft iron. A coil 17 surrounds core 14. Wires 21 and 22 extending insulatedly through holes 23 and 24 in bottom plate 16 connect coil 17 to alternating current generator 26.

An annular channel 30, filled with mercury 31, comprises an outer stainless steel ring 33 and an inner stainless steel ring 34. A bottom gasket 36 of compressible electrically non-conductive material such as rubber is interposed between bottom plate 16 and the lower edges of rings 33 and 34. A top gasket 37 of similar material is similarly interposed between the top edges of rings 33 and 34 and top plate 15. Gaskets 36 and 37, in combination with rings 33 and 34, provide the liquid-tight annular channel 30.

A soft iron annular core 41, wound over its entire length with a multi-layer coil 42 of a large number of turns of fine insulated wire, is positioned on top of top plate 15.

A plurality of copper straps 50a, 50b, 50c and 50d, extend over coil 42 and are soldered to rings 33 and 34 by solder 52. These straps pass insulatedly through slots 54 in top plate 15.

Axial bolt 55 and nut 56 hold assembly 12 together. A screw plug 57 and a compressible washer 58 permit channel 30 to be filled with mercury 31 after assembly 12 has been otherwise assembled.

Output leads 61 and 62 from coil 42 are connected to the input of a synchronous detector 71. A portion of the power input signal from terminals 26 and 27 is also fed to the input of synchronous detector 71.

The operation of the system shown in the figures is as follows. Assume that device 12 is initially at rest. There will be no relative motion between mercury 31 and the alternating magnetic lines of force extending between plates 15 and 16 through mercury 31. Under these conditions no radial potential gradient is developed in mercury 31, rings 33 and 34 are at the same electrical potential, and no current flows through straps 50.

Now if axial rotation is applied to device 12, the mercury will tend to remain stationary because of its inertia. This means that the magnetic lines of force extending through mercury 31 from plate 15 to plate 16 will move relative to the mercury. The result is that a radial potential gradient is developed in mercury 31, so that rings 33 and 34 are at different potentials and so that current flows through straps 50. Skilled persons will understand, from what has been said above, that the current through straps 50 will be an alternating current of the frequency of generator 26, that the phase of this current will shift by 180 degrees if the direction of rotation is reversed, and that the amplitude of the current will be proportional to the relative angular velocity of mercury 31 and the solid members of device 12.

It will be obvious to skilled persons that, if a uniform axial rotation is applied to device 12 for a sufficiently long period of time, this axial rotation will be gradually imparted to the mercury 31 and that the rotational velocity of the mercury 31 will gradually and asymptotically approach the rotational velocity applied to device 12, with a corresponding decrease in current through straps 50.

It will now be seen that rings 33 and 34, besides serving as the walls of channel 30, can be considered to be equivalent to the output terminals of an extremely low impedance alternating current generator with the remarkable and important characteristics of having zero output in the absence of rotation and of providing, in response to rotation, an output indicative of the rate and direction of rotation.

Because of the very low impedance and relatively low voltage of the output from rings 33 and 34, this voltage is stepped up through a highly effective step-up transformer that is an integral part of device 12. Copper straps 50 serve as the primary of this transformer and coil 42 as the secondary. A tremendous voltage gain, of the order of many thousand times, is readily achieved from output leads 61 and 62 of secondary winding 42. If desired, further voltage or power gain may be obtained from auxiliary transformers or amplifiers.

From the foregoing disclosure and explanation, skilled persons will understand that the output of synchronous detector 71, taken at output terminals 81 and 82, will be a rectified signal the polarity of which is dependent on the direction of rotation of device 12 and the amplitude of which is proportional to the angular velocity of the solid portions of device 12 relative to mercury 31. It will be realized that the output signal may be utilized in many useful ways. In a missile or space vehicle application, for example, an output signal appearing at terminals 81 and 82 can be used to correct any undesired rotation experienced by the vehicle. Or, the signal information can be telemetered to a ground station.

Although the invention can be fabricated quite economically in accordance with the foregoing disclosure the device provides a very high useful sensitivity, many times greater than that available from previous devices of far greater complexity except for elaborate and costly rate gyros.

I believe that the foregoing disclosure will enable skilled persons to practice my invention without difficulty. However, the following additional information and comments may be of value.

It is to be noted that, in the embodiment described, the annular channel is subjected to a magnetic field that is substantially uniform around the circumference of the channel. This circumferentially uniform field has an important value in minimizing the effects of turbulent flow.

Note also that rings 33 and 34 perform the important dual functions of (a) serving as the walls of channel 30 and (b) serving as highly efficient electrodes, of tremendous area, that pick up the current developed in mercury 31.

If my transducer is oscillated slowly back and forth around its axis with a sinusoidal motion, as might occur if the transducer were mounted with its axis horizontal on a slowly rolling large ship, the motion of the fluid will lag the motion of the solid body of the transducer by 90 degrees. In other words, the velocity of the fluid will be maximum when that of the solid body is minimum, and vice versa. Skilled persons will understand that this means that the output of the transducer will be proportional to the instantaneous acceleration to which the solid body of the transducer is being subjected.

On the other hand, if the sinusoidal oscillatory motion is rapid rather than slow, the fluid will remain essentially stationary. Then the output of the transducer will be a measure of the instantaneous velocity, rather than acceleration, experienced by the transducer body. (It is assumed, of course, that the frequency of the A.-C. magnetic field is high in relation to the frequency of the sinusoidal motion applied to the transducer.)

If the transducer is subjected to a sustained uniform rotation the fluid will tend to catch up with the transducer body and the output voltage will fall. However, the voltage does not fall quite to zero, and the equilibrium voltage may furnish useful velocity information.

The selection of suitable ferrous materials for core 14, plates 15 and 16, and core 41 will present no difficulty to skilled persons. Use of laminated materials is obviously advantageous for reduction of eddy current losses and improved efficiency. It is to be noted that the magnetic field from straps 50 applied to core 41 is reduced somewhat by the magnetic shunting effect of that portion of plate 15 which is encircled by straps 50. Optimum sensitivity may call for selecting, for core 41, a material having somewhat higher permeability than the material used for plate 15.

My experience and analysis indicates that the radial thickness of channel 30 is preferably relatively small in relation to the inner radius of the channel.

The optimum fluid for use in my invention is one that combines high density (and thus high inertia) with high electrical conductivity. Mercury is much the best fluid of which I am aware for use at normal temperatures. However, other fluids, including aqueous electrolytic solutions and electrically conductive organic liquids, may also be used.

It will be apparent that the embodiments shown are only exemplary and that various modifications can be made in construction and arrangement within the scope of the invention as defined in the appended claims.

I claim as my invention:

1. A rotation sensor comprising:
   (a) a cylindrical iron core;
   (b) a coil surrounding said core;
   (c) means for applying alternating current to said coil;
   (d) first and second circular end plates fastened to the ends of said core, the diameters of said end plates being substantially larger than the diameter of said core, said end plates being mutually parallel to each other and mutually perpendicular to the axis of said core;
   (e) an annular liquid-tight channel positioned between said end plates and coaxial with said core;
   (f) an electrically conductive fluid substantially filling said channel; and
   (g) first and second electrodes for sensing the development of an alternating radial potential gradient in said fluid, said electrodes being mounted in contact with said fluid and radially spaced from each other;
   (h) whereby application of rotational acceleration to said sensor about the axis of said core results in motion of said end plates relative to said fluid, the magnetic lines of force extending between said end plates cutting the conductor represented by said fluid and giving rise to a radial alternating electrical potential gradient in said fluid so that the alternating potential appearing at said electrodes is indicative of the application of rotational acceleration to said sensor.

2. The invention according to claim 1, said fluid being mercury.

3. A rotation sensor comprising:
   (a) a cylindrical iron core;
   (b) a coil surrounding said core;
   (c) means for applying an alternating current to said coil;
   (d) first and second iron end plates mounted at the ends of said core, said end plates being parallel to each other and mutually perpendicular to the axis of said core;
   (e) an inner conductive ring consisting of a section of relatively thin walled tubing, said ring having an inner diameter greater than the diameter of said coil, said ring being positioned coaxially with respect to said core and said end plates, the axial length of said ring being approximately the same as the axial dis-
   (f) an outer ring of material similar to said inner ring and of substantially the same length as the inner ring, the inner diameter of said outer ring being substantially greater than the outer diameter of said inner ring, said outer ring being positioned coaxially between said end plates;
   (g) means for sealing off the ends of said inner and outer rings thereby forming a coaxial fluid-tight annular channel between said end plates;

(h) an electrically conductive fluid substantially filling said channel;

(i) an annular transformer core of approximately the same average annular diameter as the average annular diameter of said annular channel;

(j) a transformer secondary consisting of a substantial number of turns of insulated wire around said transformer core;

(k) said transformer core and transformer secondary being positioned in proximity to the outer face of said first end plate and being coaxial with said core;

(l) at least one generally U-shaped metal strap extending from the inner surface of said inner ring, through an aperture in said first end plate, over a portion of said transformer core and secondary, to the outer surface of said outer ring, said strap providing a low resistance electrically conducting path between said inner and outer rings, and said strap functioning as a primary winding for the transformer comprising said transformer secondary;

(m) whereby an output signal appears at said transformer secondary only in response to relative motion between said fluid and said end plates.

4. The invention according to claim 3, said fluid being mercury.

5. The invention according to claim 3, there being additionally provided a synchronous detector responsive to simultaneous input voltages from the source supplying current to said first mentioned coil and to an alternating current voltage appearing at the said transformer secondary winding, one input of said detector being connected to said source and another input of said detector being connected to said secondary winding, the output of said synchronous detector being a rectified signal the amplitude of which is proportional to the relative angular motion of said end plates and said annular channel with respect to said fluid, and the polarity of said output being dependent upon the direction of motion of said end plates and said annular channel with respect to said fluid.

6. The invention acccording to claim 5, said fluid being mercury.

References Cited by the Examiner
UNITED STATES PATENTS 2,753,469  7/1956  Statham et al. _____ 73—516

WALTER L. CARLSON, *Primary Examiner.*

M. J. LYNCH, *Assistant Examiner.*